(12) United States Patent
Handa (10) Patent No.: US 6,431,569 B2
(45) Date of Patent: Aug. 13, 2002

(54) FRONT WHEEL SUSPENSION APPARATUS

(75) Inventor: Akio Handa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/796,532

(22) Filed: Mar. 2, 2001

(30) Foreign Application Priority Data

Mar. 3, 2000 (JP) ........................................ 2000-058908

(51) Int. Cl.[7] ................................................ B60G 3/20
(52) U.S. Cl. ........................ 280/124.138; 280/124.142; 280/93.51
(58) Field of Search .................... 280/124.142, 124.139, 280/124.138, 124.136, 124.135, 93.51

(56) References Cited

U.S. PATENT DOCUMENTS

| | | | | |
|---|---|---|---|---|
| RE21,348 E | * | 2/1940 | Haltenberger | ........ 280/124.136 |
| 2,263,107 A | * | 11/1941 | Smirl | ............... 280/124.139 |
| 2,303,545 A | * | 12/1942 | Graham, Jr. | ......... 280/124.142 |
| 4,538,831 A | * | 9/1985 | Kami et al. | ........... 280/124.138 |
| 5,022,673 A | * | 6/1991 | Sekino et al. | ......... 280/124.138 |

FOREIGN PATENT DOCUMENTS

JP          7-23285          5/1995

* cited by examiner

*Primary Examiner*—Peter C. English
(74) *Attorney, Agent, or Firm*—Birch, Stewart, Kolasch & Birch, LLP (57) ABSTRACT

To enlarge the up and down stroke of a front wheel without changing the layout of a steering shaft and a tie rod. An upper arm and a lower arm are arranged in an upward and downward manner, respectively. The upper and lower arms are pivotably attached to a vehicle body and respective outer end portions thereof are connected by a knuckle. The upper arm constitutes substantially a triangular shape and is provided with a front pipe, a rear pipe and a vehicle body attaching portion. Furthermore, a joint pipe is provided with a ring-like portion and a ball joint is attached thereto. A rear end portion of the vehicle body attaching portion, an escape portion in the vicinity thereof and an attaching center of a cushion attaching portion provided on the joint pipe, are respectively arranged forward from a joint center line passing through center of the ball joint and orthogonal to a vehicle body center line.

19 Claims, 7 Drawing Sheets

FRONT WHEEL SUSPENSION APPARATUS

BACKGROUND OF THE INVENTION

1. Field of the Invention

The present invention relates to a double wishbone type front suspension apparatus. In particular, the present invention relates to a double wishbone type front suspension apparatus for a saddle ride type all terrain vehicle such as a four wheel buggy.

2. Description of Background Art

Japanese Examined Utility Model Publication No. H7-23285 discloses a double wishbone type front wheel suspension apparatus of a four wheel buggy. According to the above front wheel suspension apparatus, suspension arms pivotably attached to a vehicle body are arranged in an upward and downward manner. Furthermore, a knuckle is attached to outer ends of the respective arms via ball joints and a knuckle arm provided to the knuckle and a steering arm extending from a lower end of a steering shaft are connected by a tie rod. In addition, the tie rod is arranged on rear sides of the suspension arms in plan view. Furthermore, by bending a rear side of an upper arm provided on an upper side of the suspension arms to a lower side and passing the tie rod by utilizing the bent portion, interference between the tie rod and the upper arm is avoided.

Figure 7:
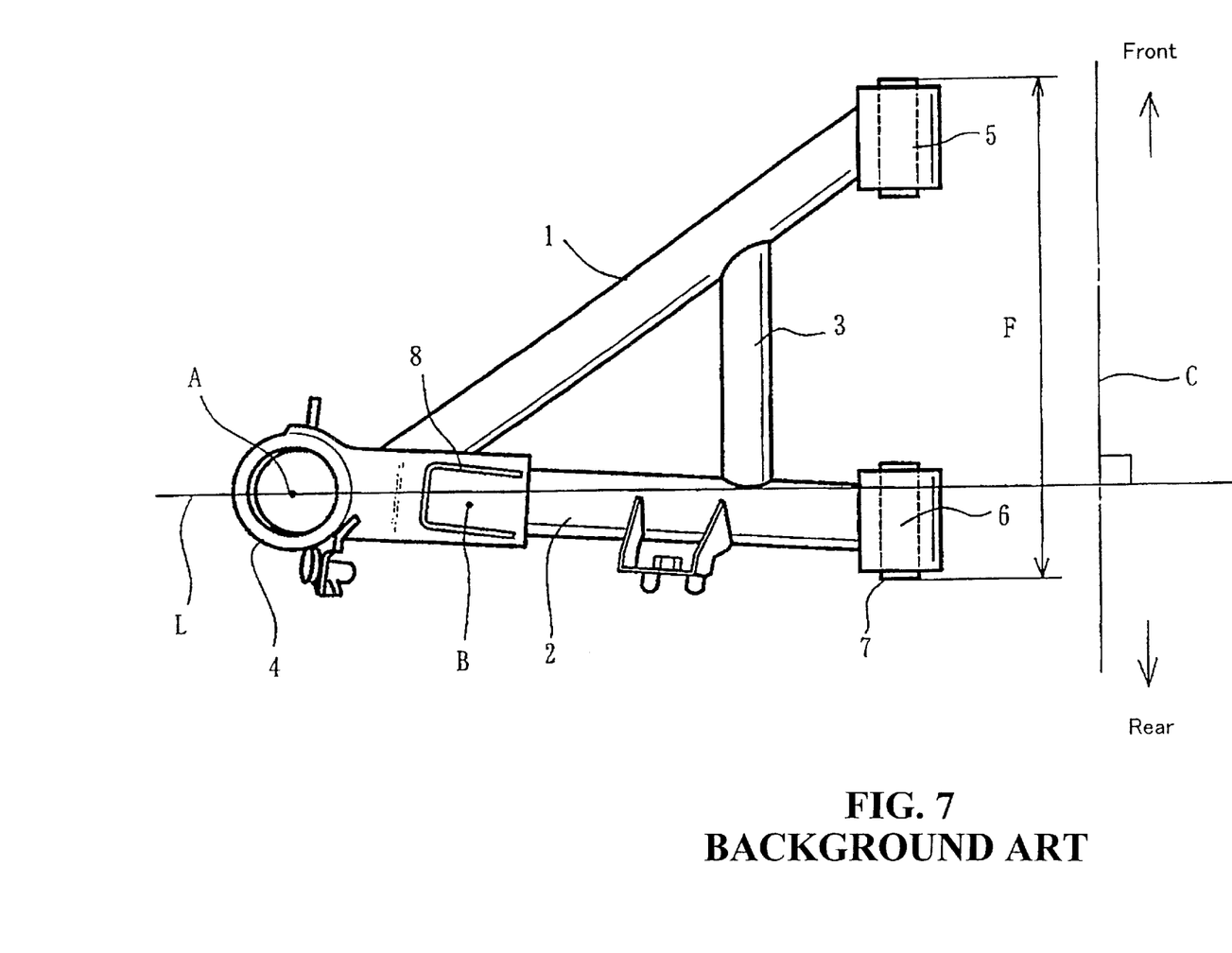
FIG. 7 is a view of an upper arm in a conventional example in correspondence with FIG. 6.

FIG. 7 of the present invention illustrates a plan view of an upper arm constituting another embodiment. According to this embodiment of the upper arm, by connecting a front pipe 1 and a rear pipe 2 substantially in a V shape and connecting middle portions of the two pipes by a cross pipe 3, the upper arm is referred to as an A arm which constitutes substantially an A shape as a whole. A ring portion 4 is provided at an outer end portion of the upper arm, connected to a knuckle via a ball joint, not illustrated, attached thereto. Furthermore, respective base portions of the front pipe 1 and the rear pipe 2 are respectively provided with a front side vehicle body attaching portion 5 and a rear side vehicle body attaching portion 6 to pivotably attach the upper arm to a vehicle body.

Referring to FIG. 7, a joint center line L is drawn to pass a ball joint center A, constituting the center of the ball joint attached to the ring portion 4, orthogonally to a vehicle center line C in a front and rear direction. Accordingly, the joint center line L intersects with the rear side vehicle body attaching portion 6. Furthermore, a rear end 7 of the rear side vehicle body attaching portion 6 extends rearward from the joint center line L. Furthermore, an attaching center B constituting a center of a cushion attaching portion 8 provided at an upper face of the upper arm is disposed rearward from the joint center line L.

In addition, when the rear portion of the upper arm is bent as in Japanese Examined Utility Model Publication No. H7-23285, mentioned above, it is advantageous, since the tie rod and the upper arm can be arranged proximate to each other. However, the forming of the bent portion is complicated. Accordingly, it is not preferable to provide a bent portion in view of the fabrication thereof.

When the upper arm is constructed as in the example of FIG. 7, it is unnecessary to bend the rear pipe 2. However, in an all terrain vehicle such as a four wheel buggy, it is sometimes desired to increase an up and down stroke of the front wheel suspension apparatus and enlarge the diameter of the front wheel. In this case, if the upper arm of FIG. 7 is used for that purpose, since the joint center line L intersects with the upper arm in plan view, when the up and down stroke of the front wheel is increased, interference of the upper arm with the tie rod may occur. Accordingly, the increase in the up and down stroke is restricted. Furthermore, the tie rod is moved in the front and rear direction during turning. Therefore, depending on a position of the attaching center of the cushion attaching portion, there is also a concern that the tie rod will interfere with the cushion unit.

In addition, when it is desired to enlarge the diameter of the front wheel, a position of the axle must be moved toward the front side. However, when the position of the axle is simply moved to the front side, it becomes necessary to change a position of the steering shaft or an inner side end portion (inner portion of the side of the steering shaft) of the tie rod in order to avoid interference between the upper arm and tie rod. However, the change of the steering shaft causes a change in riding attitude and accordingly, the change is not preferable. Furthermore, on the rear side of the tie rod, there are arranged an engine and accessories thereof. Therefore, the change with regard to the position of the inner side end portion of the tie rod is also not preferable since a large-scale change of the vehicle body layout becomes necessary.

SUMMARY OF THE INVENTION

In view of the above, it is an object of the invention to resolve the above problems. In order to resolve the above-described problems, according to a first aspect of present invention, there is provided a front wheel suspension apparatus wherein one end of a suspension arm is pivotably attached to a vehicle body. The front wheel suspension apparatus includes an upper arm and a lower arm separated from each other in an up and down direction. Outer ends of the upper and lower arms are connected via a ball joint by a knuckle which is for supporting a front wheel axle. A knuckle arm provided at the knuckle and a steering arm extended from a lower end of a steering shaft, are connected by a tie rod. Furthermore, a cushion unit is interposed between the upper arm and the vehicle body, wherein the upper arm constitutes substantially a triangular shape in plan view. In addition, a portion of the upper arm, which corresponds with a side of the triangular shape, is attached with a single vehicle body attaching portion continuous in a front and rear direction, which acts as a portion pivotably attached to the vehicle body. A side of one apex portion of the triangular shape opposed to the vehicle body attaching portion, is attached with the ball joint and a cushion attaching portion for connecting a lower end portion of the cushion unit is provided in a vicinity thereof. Furthermore, a rear end portion of the vehicle body attaching portion and an attaching center of the cushion attaching portion are respectively arranged forward from a joint center line passing through a center point of the ball joint and orthogonal to a center line of the vehicle body. In addition, the tie rod is arranged rearward from the joint center line when the tie rod is disposed at a straight line advancing position.

The rear end portion of the vehicle body attaching portion and the attaching center of the cushion attaching portion are respectively arranged forward from the joint center line. Accordingly, even when the front wheel carries out a significant up and down stroke, the rear edge portion of the vehicle body attaching portion and the cushion attaching portion do not interfere with the tie rod. Furthermore, even when the tie rod is moved in the front and rear direction when making a turn, the tie rod does not interfere with the cushion unit. In addition, when it is desired to move the position of an axle forward from a conventional position, even when the tie rod connected to the knuckle arm is advanced along with the axle without changing the position of the steering shaft, the interference with the upper arm can be avoided. The position of the axle can be made movable to the front side without changing inner side positions of the steering shaft and the tie rod.

Accordingly, larger up and down stroke of the front wheel can be ensured without requiring a change in the vehicle riding attitude or a significant change in the vehicle body layout and movement of the position of the axle is facilitated. Therefore, a large diameter formation of the front wheel is facilitated. As a result, there is provided a front wheel suspension apparatus that is preferable for an all terrain vehicle such as a four wheel buggy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
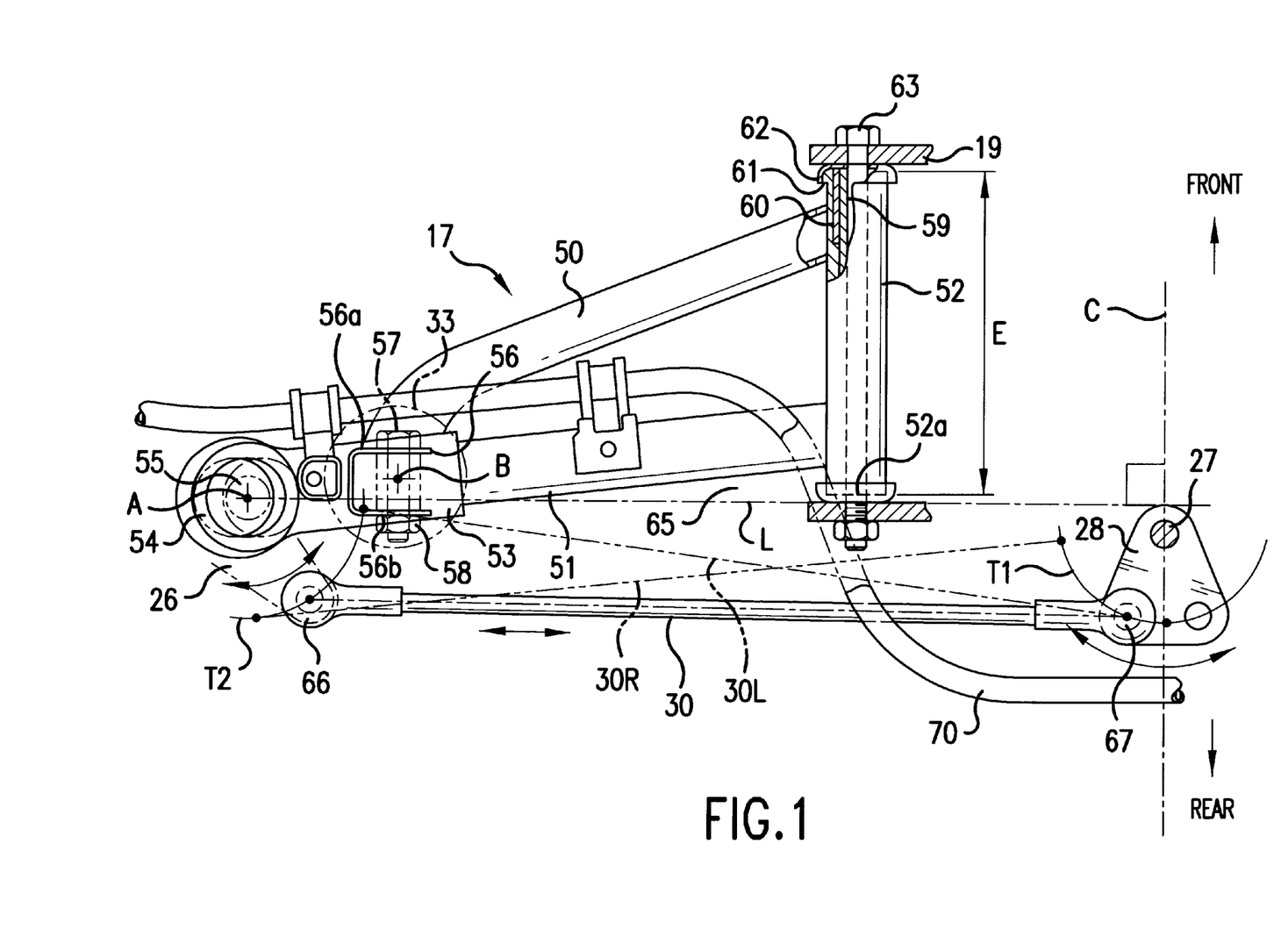
FIG. 1 is a plan view showing a plan layout of an upper arm according to a first embodiment of the present invention.
Figure 2:
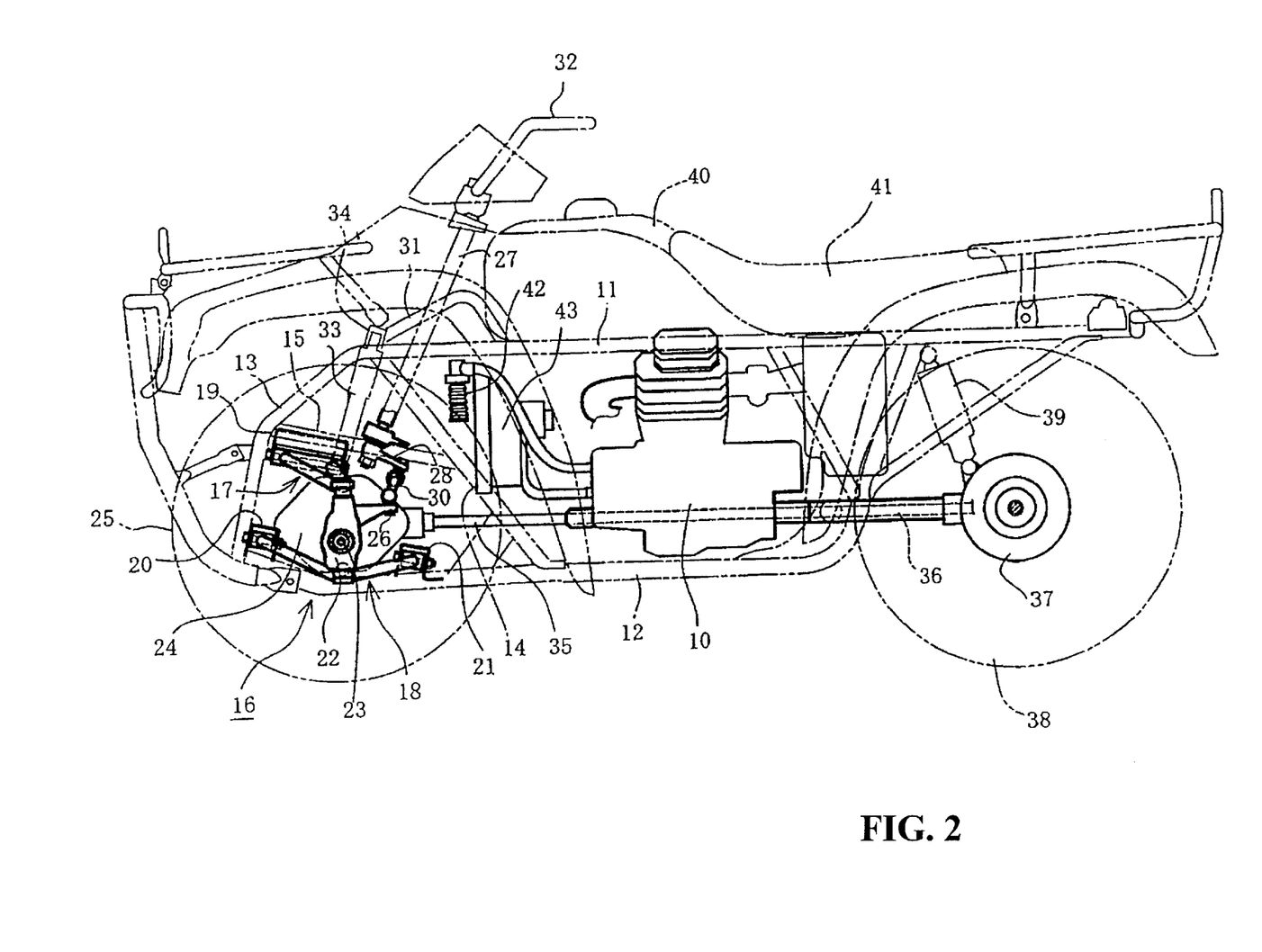
FIG. 2 is a view showing essential portions of a side of a vehicle body of a four wheel buggy according to the first embodiment.
Figure 3:
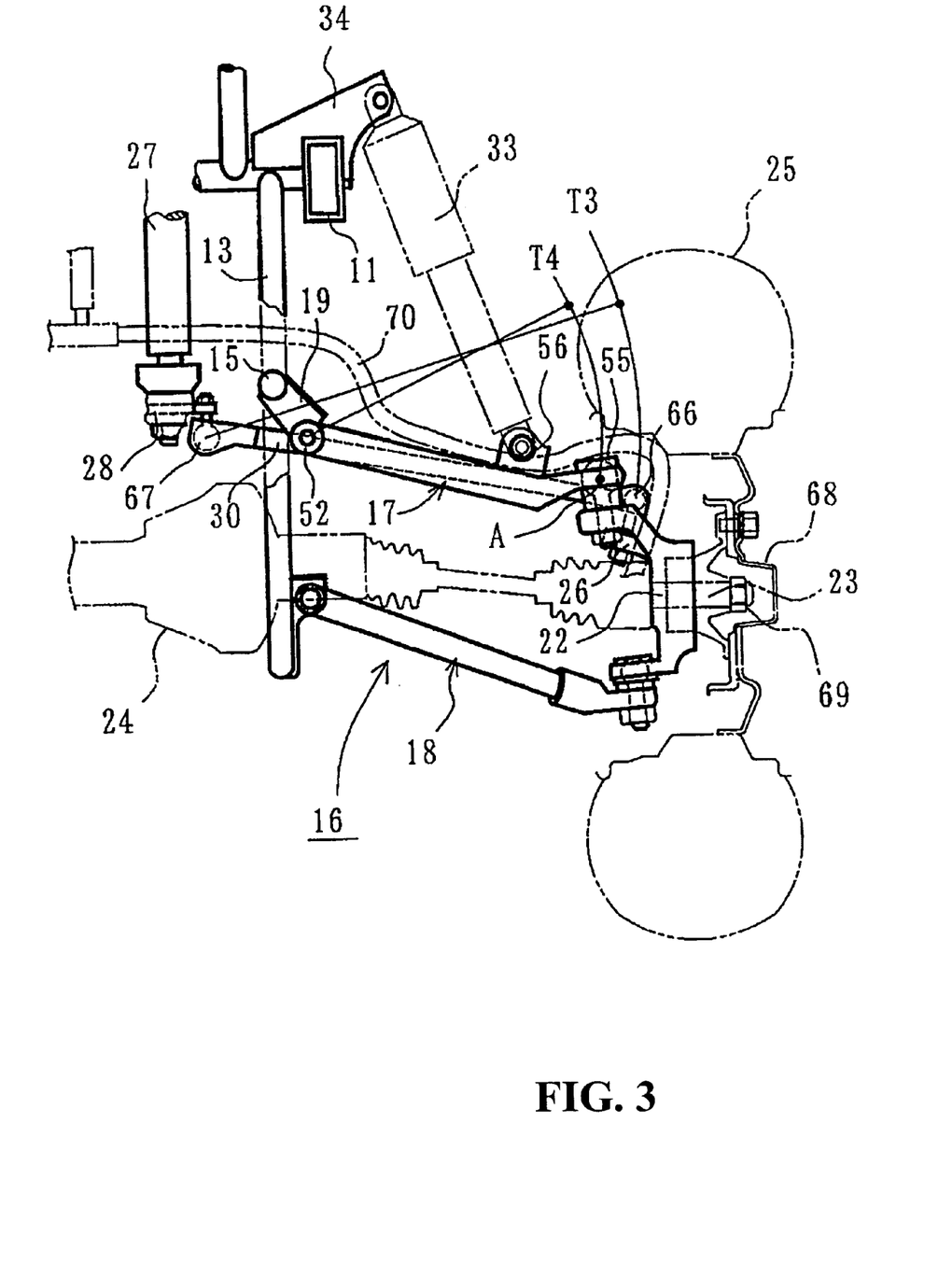
FIG. 3 is a view showing a front wheel suspension apparatus according to the first embodiment from a front side.
Figure 4:
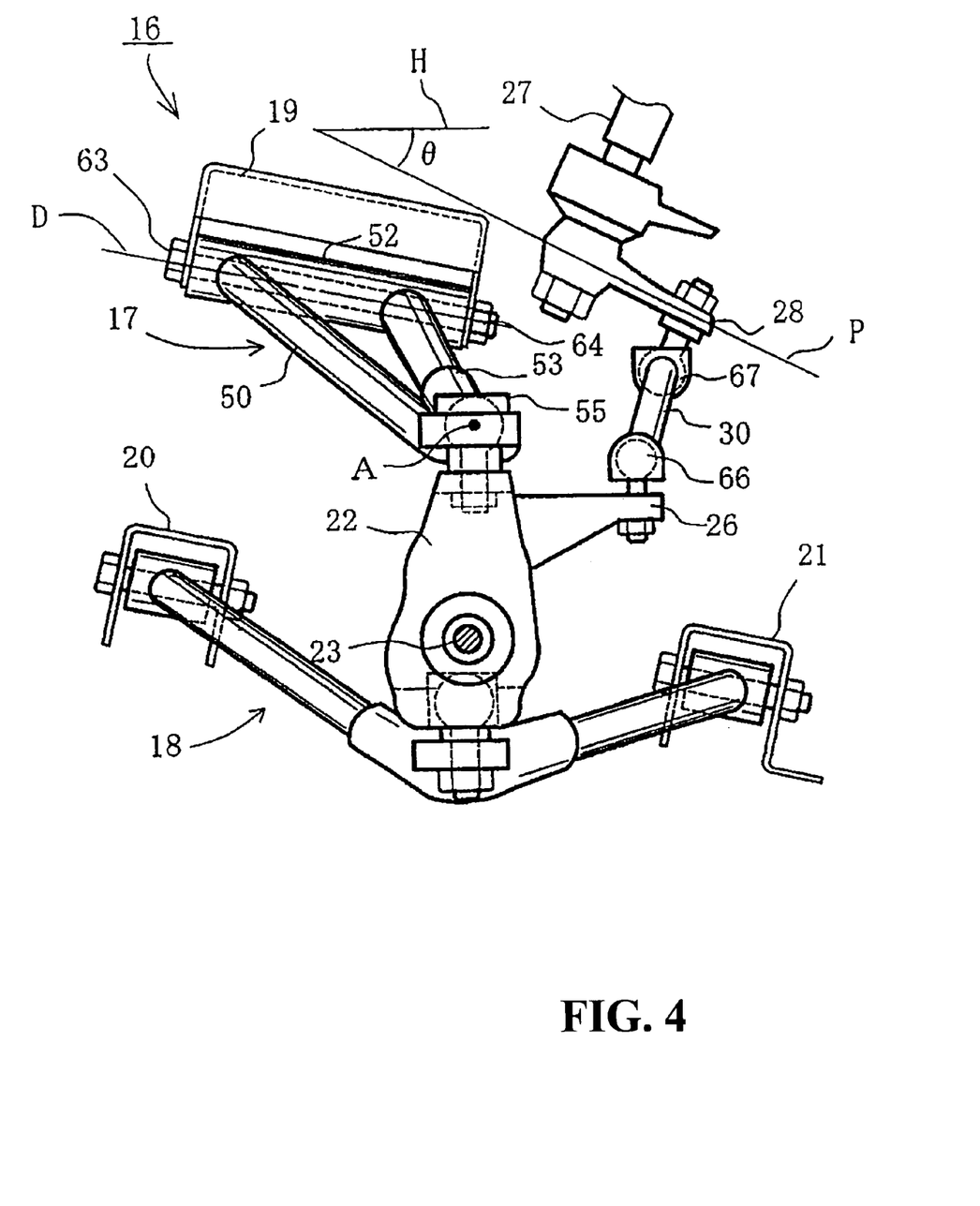
FIG. 4 is a view showing the front wheel suspension apparatus according to the first embodiment from a side.
Figure 5:
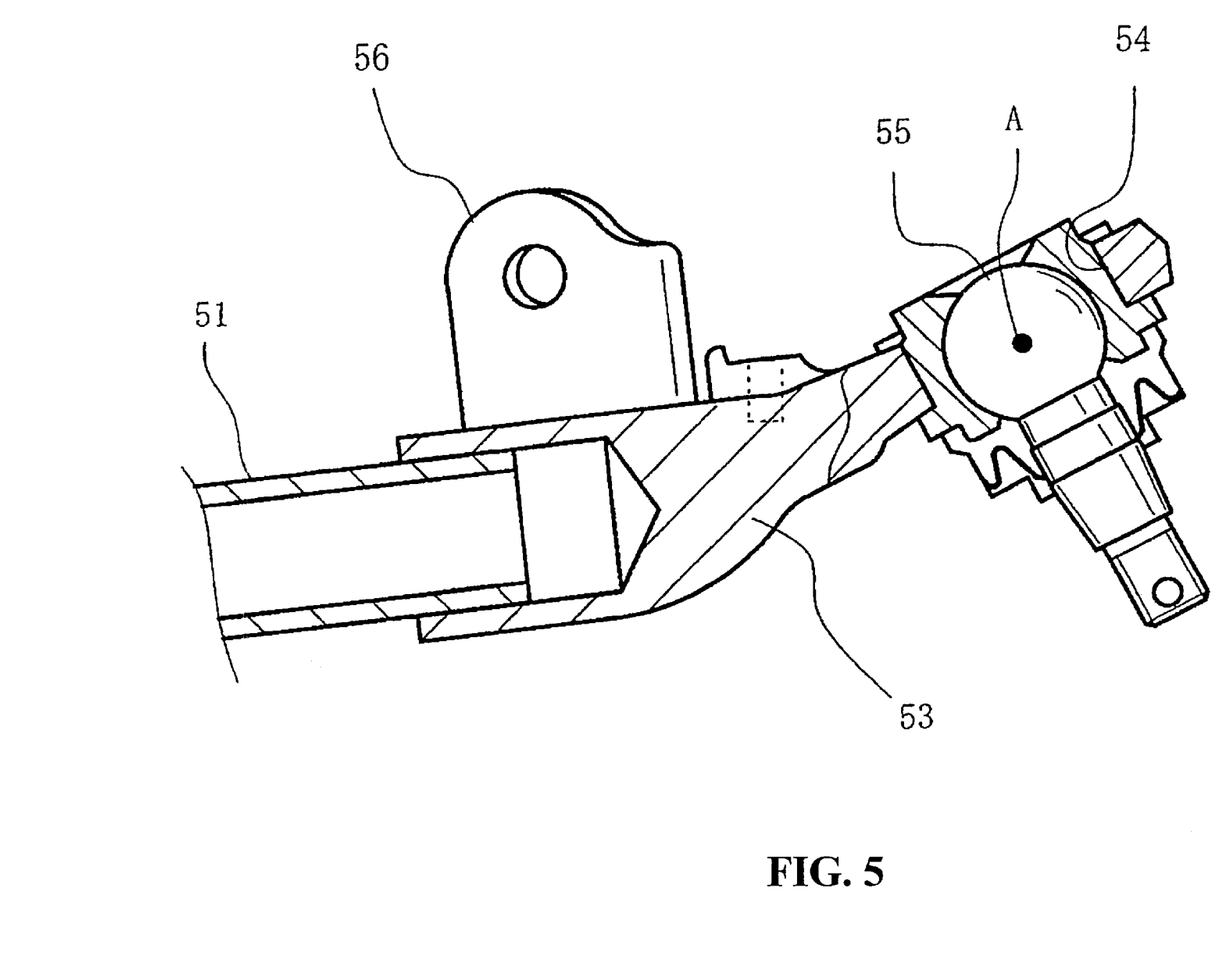
FIG. 5 is a sectional view of essential portions of an upper arm of the first embodiment.

An explanation will now be given of a first embodiment of the present invention with reference to the accompanying drawings. FIG. 1 through FIG. 5 relate to a first embodiment of the present invention. FIG. 1 is a plan view illustrating a plan layout of an upper arm and a tie rod according to the first embodiment. FIG. 2 is a view showing essential portions of a side of a vehicle body in a four wheel buggy according to the first embodiment. FIG. 3 is a view showing the front wheel suspension apparatus of the first embodiment from a front side. FIG. 4 is a view showing the front wheel suspension apparatus according to the first embodiment from a side. FIG. 5 is a sectional view of essential portions of the upper arm of the first embodiment. Furthermore, in the present invention, front side, rear side, left and right and up and down, as a rule, are indicated in accordance with the direction of advancing of the vehicle. In addition, an inner side is referred to as a center side of the vehicle in a similar manner.

First, an outline explanation will be given of a total structure of a four wheel buggy to which the first embodiment is applied. In FIG. 2, an upper frame 11 and a lower frame 12 are arranged above and below an engine 10 arranged at the center of the vehicle in the front and rear direction. The upper frame 11 and lower frame 12 are connected by a front pipe 13 in the up and down direction between front end portions thereof and are connected by an inclined down frame 14 at a remote location rearward therefrom. Furthermore, the front pipe 13 and the inclined down frame 14 are connected by a reinforcing frame 15 arranged in the front and rear direction. The vehicle body structures are provided in left and right pairs.

Double wishbone type front wheel suspension apparatus 16 are provided on the left and on the right of the vehicle body to front sides of the vehicle body surrounded by the lower frames 12, the front pipes 13, the down frames 14 and the reinforcing frames 15. The suspension arms of the front suspension apparatus 16 are constituted by an upper arm 17 and a lower arm 18. The reinforcing frame 15 is provided with a bracket 19 for pivotably connecting the upper arm 17, and similar brackets 20 and 21 for the lower arm 18 are provided at a front end portion of the lower frame 12 and a lower end portion of the front pipe 13.

Outer ends of the upper arm 17 and the lower arm 18 projected to the side are connected in the up and down direction by a knuckle 22 and a front wheel axle 23 is projected from and supported by a center thereof. The front wheel axle 23 extends from both left and right sides of a front wheel differential gear 24 supported at a front end portion of the lower frame 12 and is connected to a front wheel 25 attached with the knuckle 22 for driving in rotation therewith.

A knuckle arm 26 projecting toward the rear side is integrally provided at a middle portion of the knuckle 22 in the up and down direction. A steering arm 28 extends from a lower end portion of a steering shaft 27, which is disposed on an upper side thereof in side view. The steering arm 28 extends rearwardly and is connected to a tie rod 30. The steering shaft 27 is arranged obliquely in the up and down direction such that an upper side thereof is inclined to the rear side along a vehicle center line C (FIG. 1). The steering shaft 27 is pivotably supported by a stay 31 provided above a front end portion of the upper frame 11 and pivotable by a handle 32 attached to an upper end thereof.

A rear end portion of a vehicle attaching portion, as will be described later, of the upper arm 17, is disposed substantially directly above the front wheel axle 23 and on a front side of a lower end portion of the steering shaft 27. An upper face thereof is connected with a lower end portion of a front cushion unit 33 constituting the front wheel suspension apparatus 16. An upper end portion of the cushion unit 33 is supported by a bracket 34 provided at the front end portion of the upper frame 11.

The lower arm 18 is constructed by a structure similar to that of a conventional one. In particular, a width of the lower arm 18 is much wider than that of the upper arm 17. Furthermore, a vehicle attaching portion is provided on respective end portions of the lower arm 18. The lower arm 18 is expanded to constitute a V shape substantially symmetrically in the front and rear direction from a knuckle connecting portion of an outer end thereof. The vehicle attaching portion on the rear side is disposed at a position rearward from the steering arm 28 as shown by the bracket 21. Specifically, the width of the lower arm 18 is about twice as much as the width of the upper arm 17. Conversely, the upper arm 17 is constructed by a structure in which the width is significantly narrower than that of the lower arm 18.

Furthermore, notation 35 in the drawings, designates a front wheel propeller shaft for transmitting drive force from the engine 10 to the front wheel differential gear 24, 36 designates a rear wheel propeller shaft for transmitting the drive force from the engine 10 to a rear wheel differential gear 37, 38 designates a rear wheel, numeral 39 designates a rear cushion unit of a rear wheel suspension apparatus, 40 designates a fuel tank, 41 designates a seat, 42 designates an oil cooler constituting a portion of engine accessories and 43 designates a cooling fan thereof.

An explanation will now be provided for the upper arm 17. As shown by FIG. 1 and FIG. 5, the upper arm 17 is constituted substantially in a triangle shape in plan view as a whole by combining a front pipe 50 and a rear pipe 51 substantially in a V shape in plan view. Furthermore, respective one end portions of the front pipe 50 and the rear pipe 51 are connected together at an acute angle. Furthermore, the expanded other end side portions of the front and rear pipes 50 and 51 are connected together by a vehicle body attaching portion 52 constituting one piece of a pipe.

The front pipe 50 and the rear pipe 51 are pipe members comprising pertinent material such as iron and are coupled at an acute angle constituting substantially a V shape by fitting and integrating respective front end side end portions thereof to a joint pipe 53 provided by pertinent fabrication method such as casting. A ring-like portion 54 is provided on a front end side of the joint pipe 53 and a ball joint 55 (FIG. 5) is fitted thereto and supported thereby. An attaching leg projects from the ball joint 55 and is coupled to an upper end portion of the knuckle 22.

Furthermore, a bracket 56 constituting a cushion attaching portion for coupling a lower end portion of the front cushion unit 33, is attached to an upper face of the joint pipe 53 by welding. The bracket 56 is provided with a pair of opposed wall portions 56a and 56b by constructing the bracket 56 substantially in a channel-like shape. A lower end portion of the front cushion unit 33 contained between the pair of wall portions 56a and 56b, is pivotably attached to the bracket 56 by a bolt 57 and a nut 58.

Furthermore, when a center of a rolling face of the ball joint 55 attached to the ring-like portion 54, is defined as center A, assuming a straight line passing through this point and orthogonal to the vehicle center line C, the straight line is defined as a joint center line L. Relative to the joint center line L, a rear end portion 52a of the vehicle attaching portion 52 is disposed on or forward from the line L.

Furthermore, attaching center B constituting a middle point of the pair of opposed wall portions 56a and 56b of the bracket 56, is also disposed forward from the joint center line L. The attaching center B is also a middle point in the length direction of the bolt 57 between the pair of opposed wall portions 56a and 56b of the bracket 56.

The vehicle attaching portion 52 is a single piece of pipe-like member. A through collar 59 is inserted into the vehicle attaching portion 52. A bush 60 is interposed between outer peripheries of two ends in the length direction of the collar 59 and an inner face of the vehicle body attaching portion 52. The vehicle body attaching portion 52 coupled with the front arm 50 and the rear arm 51, is pivotable around the collar 59 by the bush 60. Furthermore, a seal 61 is attached to an end portion of the bush 60 and a cap 62 is made to cover an outer side thereof.

A positional relationship among the vehicle body attaching portion 52, the ring-like portion 54 and the like is set such that the joint center line L passes on or rearward from the rearward cap 62. Furthermore, the positional relationship is set such that the joint center line L passes rearward from the rear end portion 52a of the vehicle body attaching portion 52, even when a position of the joint center line L relative to the upper arm 17 is disposed on the frontmost side. The vehicle attaching portion 52 is pivotably attached to the bracket 19 by a bolt 63 passed through an inner side of the collar 59 and a nut 64.

The rear pipe 51 is provided obliquely inclined to the front side toward the inner side of the vehicle body relative to an axial line of the vehicle body attaching portion 52. A space formed between a rear edge portion of the rear pipe 51 and the side of the vehicle body attaching portion 52 constitutes an escape portion 65 remote from the joint center line L to the front side. The escape portion 65 can be formed such that it is constituted by almost all of a space from a base portion side of the rear pipe 51, which is connected to the vehicle body attaching portion 52, to the joint pipe 53 in the length direction of the rear pipe 51. However, the escape portion 65 can arbitrarily be set in accordance with the specification, depending on an arrangement of the tie rod 30.

In FIG. 1, the position of the tie rod 30 shown by bold lines is a position in plan view when the vehicle advances on a straight line. As is apparent in the drawing, the tie rod 30 is arranged substantially in parallel with the joint center line L. One end of the tie rod 30 is connected to the knuckle arm 26 by a pillow ball type joint 66 and the other end thereof is connected to the steering arm 28 by a similar joint 67.

The steering arm 28 constitutes substantially a triangle shape in plan view in the vicinity of the vehicle center C. A lower end of the steering shaft 27 is attached to a portion of the steering arm 28, which constitutes an apex portion of the triangular shape and projects to the front side. A pair of left and right joint attaching portions are provided on both end sides of a portion of the steering arm 28 corresponding to a side opposed to the apex corresponding portion and the left and right tie rods 30 (right side one relative to vehicle body is omitted) are connected thereto via the joints 67. Furthermore, as shown by FIG. 4, a pivoting plane P of the steering arm 28 constitutes an inclined plane elevated to the front side by an angle θ relative to a horizontal line H. The inclination angle is larger than an inclination angle of an attaching axial line D of the vehicle body attaching portion 52.

Referring back to FIG. 1, when the steering shaft 27 is pivoted, the steering arm 28 is pivoted along a locus T1. Accordingly, the joint 67 constituting a connecting point is moved on the locus T1. Therefore, the tie rod 30 is moved in the left and right direction and front and rear direction of the drawing. Furthermore, the knuckle arm 26 is pushed and pulled and pivoted along a locus T2 around a pivoting center shaft of the knuckle 22 passing through the center A of the ball joint 55. Accordingly, the tie rod 30 is also moved in the front and rear direction and left and right direction and is changed to a turning position. As a result, the front wheel 25 becomes steerable.

A right turn position of the tie rod 30 is designated by 30R in FIG. 1 and a left turn position thereof is designated by 30L, which are respectively exemplified by imaginary lines. In the case of a left turn, the tie rod 30 is pulled to the right side of the drawing. Furthermore, an end portion thereof on the side of the joint 66 gradually approaches the bracket 56 and is disposed at a position partially overlapping the upper arm 17 in plan view when the tie rod 30 turns further.

In a front view of the front wheel suspension apparatus 16, the tie rod 30 is arranged to substantially overlap the arm 17. However, the tie rod 30 is longer than the upper arm 17. Accordingly, pivotal movement of the front wheel 25 accompanied by up and down movement thereof, is carried out along a locus T3 centering on the joint 67. In addition, the upper arm 17 is shorter than the tie rod 30. Accordingly, upper arm 17 is pivoted along a locus T4 having a smaller radius of curvature than the tie rod 30.

Furthermore, the upper arm 17 and the lower arm 18 constitute a rectangular link among the vehicle body frames (12, 13, 15) and the knuckle 22. Therefore, the front wheel 25 is moved in parallel with the up and down direction and a state of overlapping of the upper arm 17 and the tie rod 30 in front view is changed. At this occasion, the pivotal movement at the outer end side of the tie rod 30 accompanied by the up and down movement of the front wheel 25 is carried out along the locus T3 having a pivoting radius longer than that of the arm 17 centering on the joint 67. In addition, since the upper arm 17 is shorter than the tie rod 30, the upper arm 17 is pivoted along the radius T4 having a radius of curvature smaller than the tie rod 30.

The knuckle 22 is contained in an inner side space provided in a wheel 68 of the front wheel 25 and is connected to the front wheel 25 by fixing the front wheel axle 23 to the wheel 68 by a nut 69. Furthermore, a brake hose 70 is arranged to intersect upper sides of the tie rod 30 and the upper arm 17 in plan view (FIG. 1). One end of the brake hose 70 is connected to a master cylinder provided at a brake lever of the handle 32 (not illustrated) and other end thereof is connected to a brake caliper (not illustrated) in the wheel 68. By arranging the brake hose 70 in this way, interference with the tie rod 30 is avoided.

An explanation will now be given of the operation of the first embodiment. In FIG. 3, when the front wheel 25 carries out an up and down stroke, the joint 66 at the outer end of the tie rod is moved on the locus T3 and the ball joint 55 at the outer end of the upper arm moves on the locus T4. The loci T3 and T4 constitute different curves since the tie rod 30 is longer. Accordingly, with respect to the same stroke, the pivoting angle of the arm 17 is larger than that of the tie rod 30. When the up and down stroke of the front wheel 25 is increased, there is brought about a state in which the tie rod 30 intersects with the tie rod 30 in the drawing.

However, as shown by FIG. 1 and FIG. 4, the escape portion 65 of the rear pipe 51 in the upper arm 17 and the rear end portion 52a of the vehicle body attaching portion 52 thereof and the attaching center B of the cushion attaching portion 56, are respectively disposed frontward from the joint center line L. Accordingly, such interference is avoided. Therefore, a larger up and down stroke of the front wheel 25 can be realized without changing respective positions of inner side end portions of the steering shaft 27, the steering arm 28 and the tie rod 30 and by leaving the respective portions at conventional positions.

Furthermore, when the handle is turned significantly for making a left turn, in FIG. 1, there is brought about a state in which the side of the knuckle arm 26 connected to the outer end side of the tie rod 30, is pivoted to the front side and overlaps the rear pipe 51 in plan view. In this case, as shown by FIG. 4, the further the front end side, the further the tie rod 30 leaves from the upper arm 17 to the lower side, a side of the vehicle body attaching portion 52 of the rear pipe 51 approaches the tie rod 30 substantially at the same height. However, by presence of the escape portion 65 and the attaching center B of the cushion attaching portion 56 which are disposed forward from the joint center line L, the interference is not produced.

Furthermore, even when the position of the front wheel axle 23 is moved to the front side, the knuckle arm 26 is moved to the front side in accordance therewith and the tie rod 30 is connected to the knuckle arm 26 that has moved to the front side. Accordingly, by the presence of the rear end portion 52a of the vehicle body attaching portion and the escape portion 65 and the attaching center B of the cushion attaching portion 56 which are disposed forward from the joint center line L, interference between the tie rod 30 and the upper arm 17, particularly the rear pipe 51 can be avoided. Therefore, the inner side positions of the steering shaft 27 and the tie rod 30 need not be changed. Therefore, the vehicle riding attitude needs not be changed.

Furthermore, even when an engine accessory, such as the front wheel differential gear 24, is proximately arranged to front sides of the steering arm 28, and the tie rod 30 and engine accessories, such as the oil cooler 42 and the cooling fan 43, are proximately arranged on rear sides thereof, vehicle body layout of these need not change significantly. Accordingly, a larger up and down stroke of the front wheel 25 can easily be ensured and movement of a position of the front wheel axle 23 is facilitated. Therefore, a large diameter formation of the front wheel 25 is facilitated. As a result, there is provided the front wheel suspension apparatus preferable for an all terrain vehicle such as a four wheel buggy.

Furthermore, the vehicle body attaching portion 52 is not divided forwardly and rearwardly as in the conventional example, but is constituted by a single member continuous in front and rear direction. Accordingly, relative to a length F (FIG. 7) which has been required from the front end of the front side vehicle attaching portion 5 to the rear end of the rear side vehicle body attaching portion 6 as in the conventional example, even when a length E (FIG. 1) of the vehicle body attaching portion 52 is made comparatively short, a sufficient length of attaching span can be ensured. Accordingly, a width of pivoting of the upper arm 17 can be made narrower than that in the conventional example.

Furthermore, the upper arm 17 is formed as an integrated member constituting substantially a triangle shape and is provided with sufficient rigidity even when the cross pipe 3 (FIG. 7) as in the conventional case is omitted. Accordingly, the upper arm 17 can be made small-sized and light-weight as a whole. Furthermore, the upper arm 17 is constituted by the front pipe 50, the rear pipe 51 and the vehicle body attaching portion 52 in a pipe shape. The upper arm 17 can be made further light-weight and inexpensive also in this respect.

Figure 6:
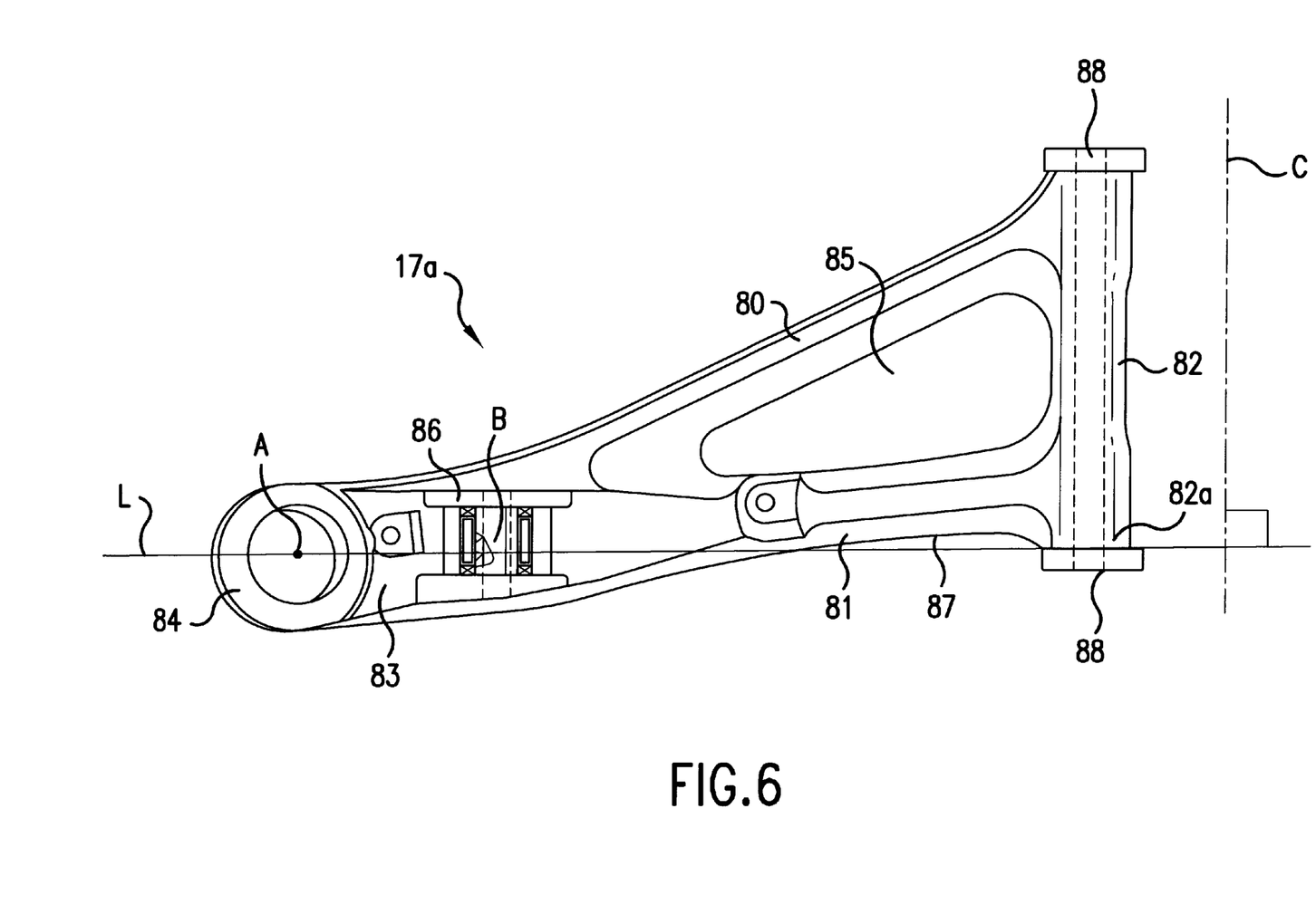
FIG. 6 is a plan view of an upper arm according to a second embodiment.

An explanation will now be given of a second embodiment of the present invention. According to the second embodiment, only the construction of the upper arm is changed. Other portions are not changed and accordingly, an explanation thereof will be omitted. FIG. 6 shows a plan view of the upper arm 17a according to the second embodiment shown by notations common to those in the first embodiment. As is apparent from the drawing, the upper arm 17a of the second embodiment is constituted by substantially a triangular shape in plan view similar to that in the previous embodiment; however, an entirety thereof is integrally formed in one piece by casting by using pertinent metal of an aluminum alloy.

At the center of the upper arm 17a, there is provided a wall through hole 85. At a surrounding portion thereof, a front portion 80, a rear portion 81 and a vehicle attaching portion 82 are provided substantially in a triangular shape. An aggregated arm portion 83 is provided at integrated outer end sides of the front portion 80 and rear portion 81, a cushion attaching portion 86 is attached substantially at a central portion thereof and a ring portion 84 for attaching a ball joint is provided at an outer end side thereof. An inner structure of the vehicle body attaching portion 82 is similar to that in the previous embodiment and 88 in the drawing designates a seal cap.

A relationship relative to the joint center line L is also similar to that in the first embodiment. The attaching center B of the cushion attaching portion 86 and a rear end portion 82a of the vehicle body attaching portion 82 are respectively disposed forward from the joint center line L, and a portion constituting a rear edge portion of the rear portion 81 and proximate to the vehicle body attaching portion 82, constitutes an escape portion 87 disposed frontward from the joint center line L. It is preferable that the escape portion 87 is formed in a range of substantially about a half or more of the rear portion 81.

When a total of the upper arm 17a is integrally formed in this way, fabrication is further facilitated than the upper arm 17a integrated with pipes as in the first embodiment and the degree of freedom with regard to shapes of respective portions such as the shape of the escape portion 87 is enlarged. Furthermore, particularly, when the upper arm 17a is cast by using an aluminum alloy, an entirety thereof can be sufficiently small-sized and light-weight.

Furthermore, the present invention is not limited to the above-described respective embodiments but can be modified or applied variously within the principle of the present invention. For example, the escape portions 65 or 87 are not necessarily needed and therefore may be abolished and the rear edge portion of the rear pipe 51 or the rear portion 81 may overlap the joint center line L.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front wheel suspension apparatus for a vehicle, comprising:

an upper arm and a lower arm separated from each other in an up and down direction and being pivotably attachable to a vehicle body, outer ends of said upper and lower arms being connected to each other by a knuckle for supporting a front wheel axle of the vehicle, said upper arm being connected to said knuckle by a ball joint, said upper arm constitutes substantially a triangular shape in plan view, a portion of said upper arm in correspondence with a side of said triangular shape is formed by a single vehicle body attaching portion that is continuous in a front and rear direction, said vehicle body attaching portion being pivotably attachable to the vehicle body, one apex portion of said upper arm being opposed to the vehicle body attaching portion and attached with the ball joint;

a knuckle arm provided on the knuckle and a steering arm extendable from a lower end of a steering shaft of the vehicle, said knuckle arm and said steering arm being connected by a tie rod;

a cushion unit interposable between said upper arm and the vehicle body;

a cushion attaching portion for connecting a lower end portion of the cushion unit is provided on said upper arm;

a rear end portion of the vehicle body attaching portion and an attaching center of the cushion attaching portion are respectively arranged forward from a joint center line passing through a center point of the ball joint and orthogonal to a center line of the vehicle body; and the tie rod is arranged rearward from the joint center line when the tie rod is disposed at a straight line advancing position.

2. The front wheel suspension apparatus according to claim 1, wherein said upper arm further comprises a front pipe and a rear pipe constituting substantially a V shape in plan view; and end portions of said front pipe and said rear pipe are connected by the vehicle body attaching portion.

3. The front wheel suspension apparatus according to claim 2, wherein an escape portion is provided at a rear edge portion of the upper arm in a vicinity of the vehicle body attaching portion.

4. The front wheel suspension apparatus according to claim 1, wherein an entirety of the upper arm is a one piece structure.

5. The front wheel suspension apparatus according to claim 4, wherein an escape portion is provided at a rear edge portion of the upper arm in a vicinity of the vehicle body attaching portion.

6. The front wheel suspension apparatus according to claim 1, wherein an escape portion is provided at a rear edge portion of the upper arm in a vicinity of the vehicle body attaching portion.

7. A front wheel suspension apparatus for a vehicle, comprising:

an upper arm and a lower arm separated from each other in an up and down direction and being pivotably attachable to a vehicle body, outer ends of said upper and lower arms being connected to each other by a knuckle for supporting a front wheel axle of the vehicle, said upper arm being connected to said knuckle by a ball joint, said upper arm constitutes substantially a triangular shape in plan view, a portion of said upper arm in correspondence with a side of said triangular shape is formed by a single vehicle body attaching portion that is continuous in a front and rear direction, said vehicle body attaching portion being pivotably attachable to the vehicle body, one apex portion of said upper arm being opposed to the vehicle body attaching portion and attached with the ball joint;

a knuckle arm provided on the knuckle and a steering arm extendable from a lower end of a steering shaft of the vehicle, said knuckle arm and said steering arm being connected by a tie rod;

a cushion attaching portion for connecting a lower end portion of a cushion unit of the suspension apparatus is provided on said upper arm;

a rear end portion of the vehicle body attaching portion and an attaching center of the cushion attaching portion are respectively arranged forward from a joint center line passing through a center point of the ball joint and orthogonal to a center line of the vehicle body; and the tie rod is arranged rearward from the joint center line when the tie rod is disposed at a straight line advancing position.

8. The suspension apparatus according to claim 7, wherein said upper arm further comprises a front pipe and a rear pipe constituting substantially a V shape in plan view; and end portions of said front pipe and said rear pipe are connected by the vehicle body attaching portion.

9. The suspension apparatus according to claim 8, wherein an escape portion is provided at a rear edge portion of the upper arm in a vicinity of the vehicle body attaching portion.

10. The suspension apparatus according to claim 7, wherein an entirety of the upper arm is a one piece structure.

11. The suspension apparatus according to claim 10, wherein an escape portion is provided at a rear edge portion of the upper arm in a vicinity of the vehicle body attaching portion.

12. The suspension apparatus according to claim 7, wherein an escape portion is provided at a rear edge portion of the upper arm in a vicinity of the vehicle body attaching portion.

13. A front wheel suspension apparatus for a vehicle, comprising:

an upper arm and a lower arm separated from each other in an up and down direction and being pivotably attachable to a vehicle body;

a knuckle for supporting a front wheel axle of the vehicle, said knuckle connecting outer ends of said upper and lower arms to each other, said upper arm being connected to said knuckle by a ball joint;

said upper arm constitutes substantially a triangular shape in plan view, a portion of said upper arm in correspondence with a side of said triangular shape is formed by a single vehicle body attaching portion that is continuous in a front and rear direction, said vehicle body attaching portion being pivotably attachable to the vehicle body, one apex portion of said upper arm being opposed to the vehicle body attaching portion and attached with the ball joint;

a rear end portion of the vehicle body attaching portion is arranged forward from a joint center line passing through a center point of the ball joint and orthogonal to a center line of the vehicle body; and a cushion attaching portion for connecting a lower end portion of a cushion unit of the suspension apparatus, said cushion attaching portion being provided on said upper arm, and an attaching center of the cushion attaching portion is arranged forward from the joint center line.

14. The suspension apparatus according to claim 13, wherein said upper arm further comprises a front pipe and a rear pipe constituting substantially a V shape in plan view; and end portions of said front pipe and said rear pipe are connected by the vehicle body attaching portion.

15. The suspension apparatus according to claim 14, wherein an escape portion is provided at a rear edge portion of the upper arm in a vicinity of the vehicle body attaching portion.

16. The suspension apparatus according to claim 13, wherein an entirety of the upper arm is a one piece structure.

17. The suspension apparatus according to claim 16, wherein an escape portion is provided at a rear edge portion of the upper arm in a vicinity of the vehicle body attaching portion.

18. The suspension apparatus according to claim 13, wherein an escape portion is provided at a rear edge portion of the upper arm in a vicinity of the vehicle body attaching portion.

19. The suspension apparatus according to claim 13, further comprising a knuckle arm provided on the knuckle and a steering arm extendable from a lower end of a steering shaft of said vehicle, said knuckle arm and said steering arm being connected by a tie rod, the tie rod being arranged rearward from the joint center line when the tie rod is disposed at a straight line advancing position.

* * * * *